(12) United States Patent
Horihata

(10) Patent No.: US 9,541,937 B2
(45) Date of Patent: Jan. 10, 2017

(54) IN-VEHICLE COMMUNICATION SYSTEM

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Satoshi Horihata, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 169 days.

(21) Appl. No.: 14/380,181

(22) PCT Filed: Feb. 5, 2013

(86) PCT No.: PCT/JP2013/052540
§ 371 (c)(1),
(2) Date: Aug. 21, 2014

(87) PCT Pub. No.: WO2013/136872
PCT Pub. Date: Sep. 19, 2013

(65) Prior Publication Data
US 2015/0025704 A1   Jan. 22, 2015

(30) Foreign Application Priority Data

Mar. 14, 2012   (JP) ................................. 2012-057835

(51) Int. Cl.
*G06F 1/32* (2006.01)
*G05F 1/66* (2006.01)
(Continued)

(52) U.S. Cl.
CPC ................. *G05F 1/66* (2013.01); *H04L 12/12* (2013.01); *H04L 12/40006* (2013.01);
(Continued)

(58) Field of Classification Search
None
See application file for complete search history.

(56) References Cited

U.S. PATENT DOCUMENTS

2002/0006139 A1* 1/2002 Kikkawa ................. H04L 12/12
370/502
2003/0117298 A1 6/2003 Tokunaga et al.
(Continued)

FOREIGN PATENT DOCUMENTS

| CN | 1721226 A | 1/2006 |
|---|---|---|
| CN | 100414917 C | 8/2008 |

(Continued)

OTHER PUBLICATIONS

International Search Report issued in International Application No. PCT/JP2013/052540 dated Apr. 16, 2013.
(Continued)

*Primary Examiner* — Paul Yanchus, III
(74) *Attorney, Agent, or Firm* — Oliff PLC

(57) ABSTRACT

An in-vehicle communication system capable of performing power supply control of the system according to the user's preference while simplifying the configuration of a control device for controlling a device based on information to be relayed. A control part of a GW device extracts information required for power supply control of loads from CAN messages received by first to third communication parts, specifies vehicle state based on the extracted information, determines power supply states in which the loads preliminarily stored into a power supply state table are to be, by associating the states with the specified vehicle state, and
(Continued)

then transmits control information for providing an instruction of the determined power supply state to the power supply control device. The power supply state table in the storage part is rewritable, and a part of the power supply state table may be updated according to the preference of a vehicle's user.

10 Claims, 10 Drawing Sheets

(51) Int. Cl.
    *H04L 12/12* (2006.01)
    *H04L 12/40* (2006.01)
    *H04L 12/46* (2006.01)
    *H04L 25/20* (2006.01)
    *H04L 29/08* (2006.01)

(52) U.S. Cl.
    CPC .... *H04L 12/40039* (2013.01); *H04L 12/4625* (2013.01); *H04L 25/20* (2013.01); *H04L 67/12* (2013.01); *H04L 2012/40215* (2013.01); *Y02B 60/34* (2013.01)

(56) References Cited

U.S. PATENT DOCUMENTS

2005/0102430 A1* 5/2005 Huber .................. G06F 1/3203
    709/250

2006/0013237 A1* 1/2006 Furuta ..................... H04L 12/12
    370/401
2012/0030330 A1* 2/2012 Rocher ............. H04L 12/40039
    709/223

FOREIGN PATENT DOCUMENTS

| | | |
|---|---|---|
| CN | 101301858 A | 11/2008 |
| CN | 101763104 A | 6/2010 |
| JP | 2001-257694 A | 9/2001 |
| JP | 2002-111699 A | 4/2002 |
| JP | 2002-261790 A | 9/2002 |
| JP | A-2004-122993 | 4/2004 |
| JP | A-2005-022556 | 1/2005 |
| JP | A-2007-196971 | 8/2007 |
| JP | A-2007-251722 | 9/2007 |
| JP | A-2009-232254 | 10/2009 |
| JP | A-2009-278531 | 11/2009 |
| JP | 2010-101681 A | 5/2010 |
| JP | A-2011-039608 | 2/2011 |

OTHER PUBLICATIONS

Apr. 21, 2016 Office Action issued in U.S. Appl. No. 14/378,029.
Mar. 26, 2013 International Search Report issued in International Application No. PCT/JP2013/052006.
Nov. 4, 2016 Office Action issued in U.S. Appl. No. 14/378,029.
Sep. 18, 2016 Office Action issued in Chinese Patent Application No. 201380009658.2.

* cited by examiner

FIG. 2

VEHICLE STATE TABLE

| INPUT | | | | | | | | | OUTPUT |
|---|---|---|---|---|---|---|---|---|---|
| S1 | S2 | S3 | S4 | S5 | I1 | I2 | I3 | ... | |
| 1 | 1 | — | — | — | — | — | — | ... | scene 1 |
| 1 | 1 | 1 | 0 | — | — | — | — | ... | scene 2 |
| 1 | 1 | — | — | — | x | y | — | ... | scene 3 |
| ⋮ | ⋮ | ⋮ | ⋮ | ⋮ | ⋮ | ⋮ | ⋮ | ⋮ | ⋮ |
| 0 | 0 | 1 | 1 | 1 | — | — | z | ... | scene N |

FIG. 3

POWER SUPPLY STATE TABLE

| CONDITIONS | | | | | CONTROL INFORMATION (INSTRUCTION TO TURN ON/OFF) |
|---|---|---|---|---|---|
| S1 | S2 | S3 | S4 | S5 | |
| 1 | 1 | 0 | 0 | 0 | 0 1 0 1 0 0 0 0 |
| 1 | 1 | 1 | 0 | 0 | 0 1 0 1 1 1 0 0 |
| 1 | 1 | 0 | 0 | 0 | 0 0 0 0 0 0 0 1 |
| ⋮ | ⋮ | ⋮ | ⋮ | ⋮ | ⋮ |
| 0 | 0 | 1 | 1 | 1 | 0 0 0 0 1 1 1 1 |

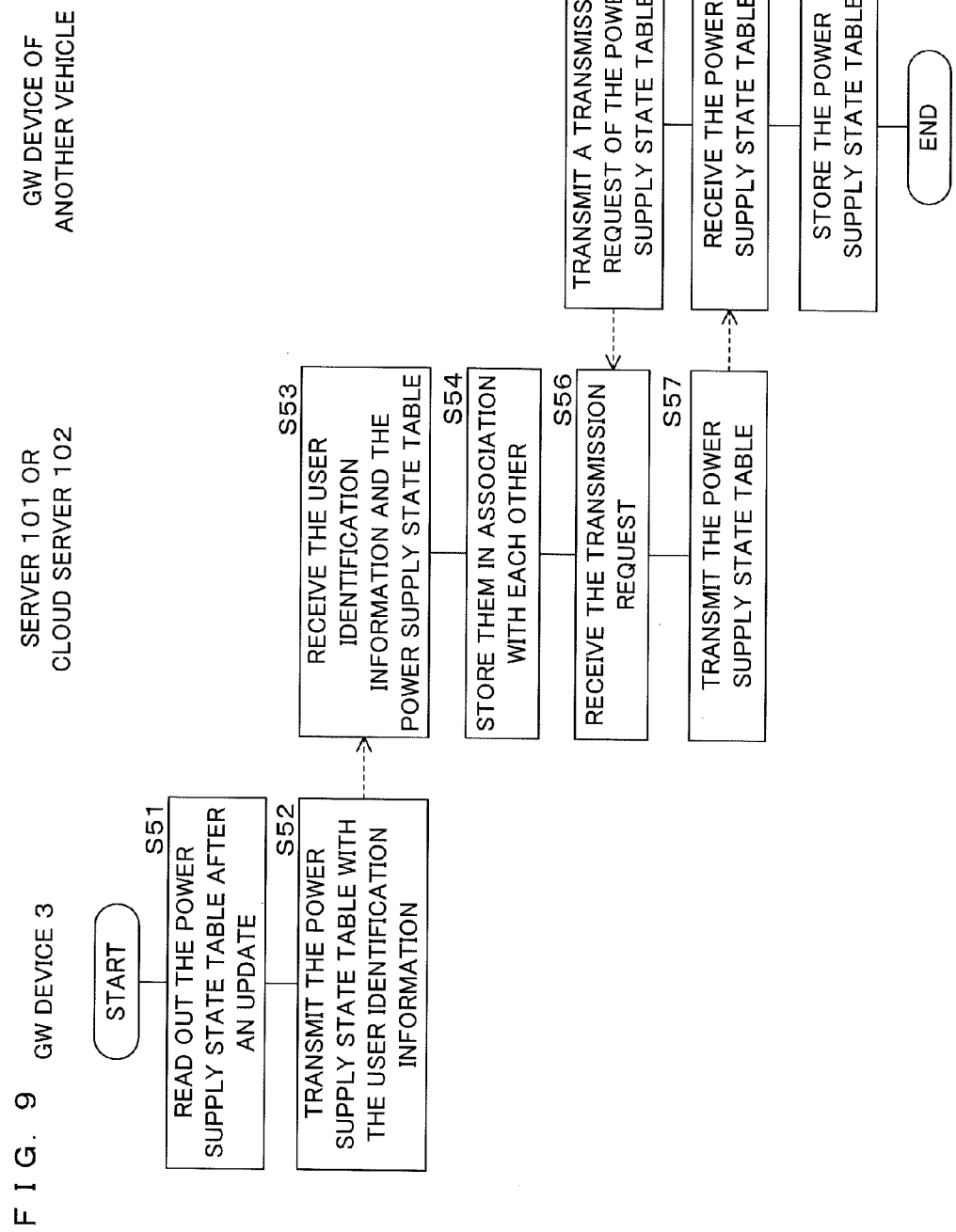

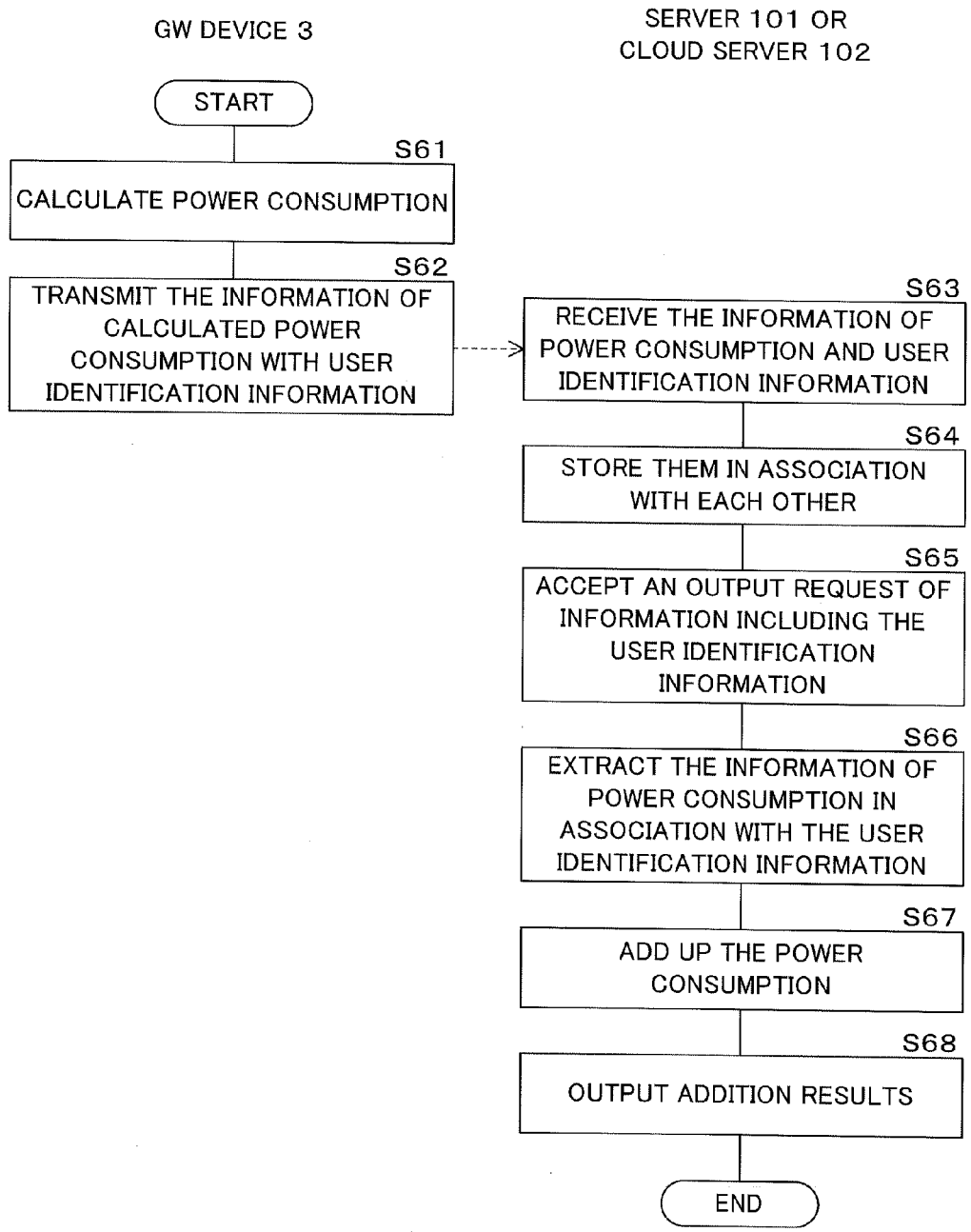

IN-VEHICLE COMMUNICATION SYSTEM

This application is the national phase under 35 U.S.C.§371 of PCT International Application No. PCT/JP2013/052540 which has an International filing date of Feb. 5, 2013 and designated the United States of America.

BACKGROUND OF THE INVENTION

1. Field of the Invention

The present invention relates to an in-vehicle communication system that includes a relay device for a relay of information among different communication buses. In particular, the present invention relates to an in-vehicle communication system capable of properly controlling power supply of the system according to the user's preference while simplifying the configuration of a control device for controlling devices based on information to be relayed.

2. Description of Related Art

In the field of vehicle control, the configuration in which a number of electronic control units (ECU) for respectively controlling devices mounted in a vehicle are connected by communication buses to transmit/receive information mutually for executing various processing is commonly used. Since the number of ECUs connected to a communication bus is limited or a communication speed is varied according to the function of an ECU, a configuration is adopted in which ECUs are divided into a plurality of groups, each of which is connected to a communication bus, and a relay device (gateway) is connected between different communication buses.

With an in-vehicle communication system having a relay device, each communication device transmits an information group with a collection of multiple pieces of information based on a communication protocol, and, between different communication buses, a relay device receives the information group collectively transmitted from each communication device and determines whether or not the information group without modifications thereto is transmitted to another communication bus, to achieve a relay.

Specifically, in an example based on a CAN (Controller Area Network) generally used in the field of an in-vehicle communication system related to vehicle control, FA (Factory Automation) or OA (Office Automation), each ECU stores signal information obtained from devices in the data part of a CAN message identified by CAN ID and collectively transmits the information. A relay device achieves relay processing with a message routing function by referring to, for each of the received CAN messages, a routing table which is stored for each CAN ID and which specifies a communication bus of a relay destination, and by transmitting, as for the CAN message required for a relay, the received CAN message without modification thereto to the communication bus of a relay destination.

Power saving of the whole control system is demanded particularly in the field of vehicle control. Therefore, an in-vehicle communication system including a power management ECU connected to any one of communication buses in an in-vehicle communication system for power supply control such as the distribution of power to in-vehicle devices mounted to a vehicle according to a vehicle state is disclosed.

SUMMARY OF INVENTION

According to the disclosed system disclosed, a power management ECU is configured to control the transition between an operation state and an idle (sleep) state by performing a variety of determination processing based on the condition obtained from other ECUs. With the configuration including a relay device, the power management ECU receives different types of information via the relay device and performs processing for controlling state transition based on the received information. In this case, the relay device performs all relays of messages containing information required for making decisions carried out by the power management ECU through a message routing function, and the power management ECU extracts the information required for state transition control from all messages and then uses the information. In this case, determination processing is performed by both of the relay device and the power management ECU, and it is difficult to simplify the configurations of both devices. In addition, since information not required in state transition control is also included in the message which is transmitted to the power management ECU from the relay device, communication resources are not effectively utilized.

Light-weighting, space-saving and cost reduction are demanded especially in an in-vehicle communication system mounted to a vehicle. Accordingly, it is required to simplify at least one of the configurations of the relay device and the ECU for power management.

In view of these circumstances, the present invention aims to provide an in-vehicle communication system capable of properly controlling power supply of the system according to the user's preference while simplifying the configuration of a control device for controlling devices based on information to be relayed and reducing cost of the whole system.

An in-vehicle communication system according to the present invention includes a plurality of communication buses mounted in a vehicle, a plurality of communication devices respectively connected to the plurality of communication buses for transmitting/receiving an information group with a collection of one or a plurality of pieces of information, and a relay device provided with a plurality of communication parts respectively connected to the plurality of communication buses that transmits/receives an information group through the plurality of communication devices and relays information among different communication buses. The in-vehicle communication system further includes one or a plurality of power supply control devices for communicating with the relay device and performing power supply control of one or a plurality of devices based on the information transmitted from the relay device; the relay device includes storing means for storing in a rewritable manner a power supply state table indicative of a power supply state in which the above-described one or a plurality of in-vehicle devices are to be under each vehicle state for each of a plurality of vehicle states predetermined according to the vehicle; extracting means for extracting information required for power supply control of the above-described one or a plurality of in-vehicle devices; specifying means for specifying a vehicle state based on the information extracted by the extracting means; determining means for determining a power supply state in which the above-described one or a plurality of in-vehicle devices are to be based on the vehicle state specified by the specifying means and the power supply state table stored by the storing means; means for creating control information for providing an instruction of a power supply state determined by the determining means; and means for transmitting control information created by the means to the power supply control device.

According to the present invention, an in-vehicle communication system is connected to a relay device, and is provided with one or a plurality of power supply control devices for power supply control of one or a plurality of in-vehicle devices respectively. With the relay device, the necessary information for controlling in-vehicle devices is extracted from an information group, and a power supply state in which each in-vehicle device is to be in accordance with the vehicle state is determined based on the power supply state table. With the relay device, the control information for providing an instruction of the determined power supply state is transmitted to the power supply control device. In addition, the power supply state table is stored in a rewritable manner. Rewriting the power supply state table for each vehicle can achieve fine power supply control so as to suit the characteristics of each vehicle or the preference of a user or to eliminate unnecessary power consumption. The power supply state includes a case where a current amount or a voltage value also varies even if it is in a power-on state, such as a power-on state, a power-off state, a sleep state or the like.

The in-vehicle communication system according to the present invention further comprises means for receiving an update of a part or all of the power supply state table.

According to the present invention, an update of the power supply state table stored by the storing means of the relay device in the in-vehicle communication system can be received. Updating the power supply state table can achieve fine power control so as to suit the characteristics of each vehicle or the preference of a vehicle's user or to eliminate unnecessary power consumption.

The in-vehicle communication system according to the present invention further comprises a wireless communication device, which is located at a location different from the vehicle, and performs transmitting/receiving through wireless communication with the relay device. The wireless communication device includes means for transmitting a power supply state table corresponding to the vehicle to the relay device. The relay device causes the storing means to store the power supply state table received from the wireless communication device. The determining means determines a power supply state based on the power supply state table stored by the storing means.

The present invention includes a wireless communication device located at a location different from a vehicle that performs an exchange of information through wireless communication with a relay device. The power supply state table stored by the storing means of the relay device may be the one transmitted from the wireless communication device. Fine power supply control can be achieved by transmitting a power supply state table corresponding to each vehicle or the preference of a user from the wireless communication device managed by a vehicle manufacturer, a vehicle dealer, a service center or the like.

The in-vehicle communication system according to the present invention is located at a location different from the vehicle, and further comprises a wireless communication device that performs transmitting/receiving of information through wireless communication with the relay device. The relay device further comprises means for transmitting a power supply state table stored by the storing means and user identification information for identifying a user of the vehicle to the wireless communication device. The wireless communication device comprises means for receiving a power supply state table and user identification information transmitted from the relay device; means for storing the received power supply state table associated with the received user identification information; means for receiving a table transmission request containing user identification information and means for transmitting a power supply state table associated with the user identification information to the request source.

The present invention includes a wireless communication device located at a location different from a vehicle that performs an exchange of information through wireless communication with a relay device. The power supply state table stored by storing means of a relay device is transmitted from the relay device to the wireless communication device with user identification information for identifying a user of the vehicle, and then is stored in association with the user identification information. The power supply state table is transmitted from the wireless communication device to the request source in response to the table transmission request containing user identification information. Therefore, it is possible to transmit a power supply state table corresponding to a user to another vehicle from the wireless communication device even if a user boards on a different vehicle. It is also possible that different vehicles share power supply control according to the preference of a user.

The in-vehicle communication system according to the present invention further comprises a wireless communication device, which is located at a location different from the vehicle and transmits/receives information through wireless communication with the relay device. The relay device further includes creating means for creating information related to power consumption of a vehicle based on control information for providing an instruction of a power supply state determined by the determining means and means for transmitting user identification information for identifying the user of the vehicle and information related to power consumption created by the creating means. The wireless communication device includes means for receiving information related to the user identification information and power consumption and means for storing information related to the received power consumption in association with the user identification information.

According to the present invention, the information on power consumption of a vehicle based on the control information, which is transmitted from a relay device to a power supply control device, is transmitted to a wireless communication device along with the user identification information of a vehicle's user and stored separately for user identification information in the wireless communication device. Therefore, it is possible to manage information related to the power consumption of an in-vehicle device for each user. Since the wireless communication device receives and stores the information, it is possible to manage the identical information as identified even if one user boards on a different vehicle.

According to the present invention, a relay device extracts information required for power supply control, and then transmits control information for providing an instruction of a power supply state for each in-vehicle device determined from the extracted information. Accordingly, the power supply control device does not need to execute processing of obtaining respective pieces of necessary information from an information group, but may control based on the transmitted control information. The relay device according to the present invention does not determine the necessity of an information group received as in the conventional way and then perform transmitting, but executes processing of creating control information by collecting information required for each communication device and then performs transmitting. Therefore, it is possible to suppress load on communication without transmitting unnecessary information. The processing executed by the relay device becomes complicated, however, the configuration of the power supply control device and each communication device can be simplified so that it is also possible to reduce cost of the whole in-vehicle communication system.

According to the present invention, the relay device collects information of the whole system, and performs power supply control by referring to a power supply state table based on the collected information. By setting the power supply state table to conform to the characteristics of a vehicle or the preference of a vehicle's user, it is possible to modify a device which is to be under a power-on state, power-off state, or a sleep state according to the vehicle state. For example, the power supply control can be properly controlled so as to achieve power saving, prevention of battery exhaustion by cutting power supply to devices unused or devices having lower order of priority of operation and the like. Moreover, since the power supply state table is rewritable, it is also possible to modify an in-vehicle device by cutting off power according to the user's preference.

BRIEF DESCRIPTION OF THE SEVERAL VIEWS OF THE DRAWINGS

FIG. 2 is an explanatory view showing an example of the content of a vehicle state table included in a GW device according to Embodiment 1;

FIG. 3 is an explanatory view showing an example of the content of a power supply state table included in the GW device according to Embodiment 1;

FIG. 9 is a flowchart showing an example of a processing procedure in which a power supply state table is shared by different vehicles; and FIG. 10 is a flowchart showing an example of transmitting/receiving processing of information related to power consumption according to Embodiment 2.

DETAILED DESCRIPTION

The present invention is described below with reference to the drawings that illustrate the embodiments thereof (Embodiment 1)

Figure 1:
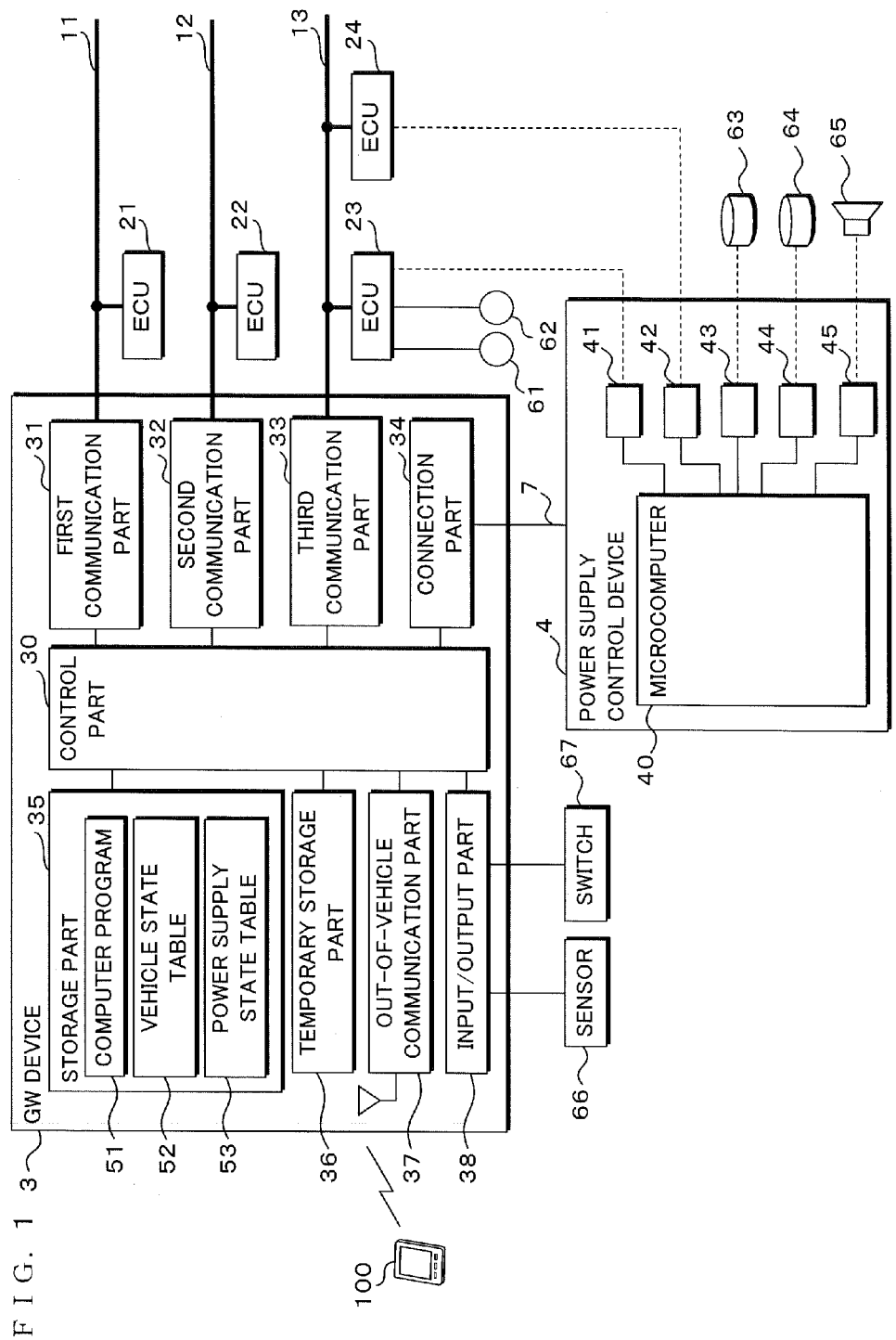
FIG. 1 is a block diagram showing the configuration of an in-vehicle communication system according to Embodiment 1.

FIG. 1 is a block diagram that showing the configuration of an in-vehicle communication system according to Embodiment 1. The in-vehicle communication system includes a plurality of communication buses 11 to 13 mounted in a vehicle, ECUs 21 to 24 respectively connected to the communication buses 11 to 13 for controlling devices, a GW (Gate Way) device 3 executing relay processing for information among the communication buses 11 to 13, a power supply control device 4 executing power supply control of each device, in-vehicle loads 61 to 65 to be controlled objects, and a sensor 66 and a switch 67 arranged in a vehicle.

In Embodiment 1, communication via any of the communication buses 11 to 13 mounted in a vehicle is compliant with a CAN protocol. The plurality of communication buses 11 to 13 are discriminated by the types of subjects to be controlled by the connected ECUs 21 to 24. In other words, the plurality of communication buses 11 to 13 are discriminated by the types of information to be transmitted or received. A communication speed may be set differently for each of the communication buses 11 to 13. For example, the plurality of ECUs 21 for performing a chassis control including dynamic control, travel control and the like are connected to the communication bus 11, and the information of a measuring instrument and information on traveling control are transmitted/received through the communication bus 11. The plurality of ECUs 22 for performing control of a power supply control system are connected to the communication bus 12, and the information on a power supply control system such as battery information is transmitted/received through the communication bus 12. The plurality of ECUs 23 and 24 for performing body control are connected to the communication bus 13, and the information related to door lock, security or the like is transmitted/received through the communication bus 13.

The ECUs 21 to 24 include a microcomputer (not illustrated) and a CAN transceiver, and each of which is connected to any one of the communication buses 11 to 13. The microcomputers included in the ECUs 21 to 24 having a CAN controller function receive a CAN message transmitted to the communication buses 11 to 13 and also transmit a CAN message. Sensors (not illustrated) are connected to the ECUs 21 and 22. The microcomputers of the ECUs 21 and 22 transmit CAN messages including signal information obtained from the sensors to the communication buses 11 and 12 respectively. The ECU 23 connects to actuators 61, 62. The microcomputer of the ECU 23 controls the operation of the actuators 61, 62 based on the signal information included in a CAN message transmitted to the communication bus 13.

The GW device 3 includes a control part 30, a first communication part 31, a second communication part 32, a third communication part 33, a connection part 34, a storage part 35, a temporary storage part 36, an out-of-vehicle communication part 37 and an input/output part 38.

The control part 30 uses a CPU (Central Processing Unit). The control part 30 uses the temporary storage part 36 as a transmit buffer or receive buffer to achieve relay processing by executing transmitting/receiving via the first to third communication parts 31 to 33 based on a program 51 stored in the storage part 35. The control part 30 may be substituted by an MPU (Micro Processing Unit).

Each of the first to third communication parts 31 to 33 includes a CAN controller and a CAN transceiver to achieve transmitting/receiving of a CAN message based on a CAN protocol. The first communication part 31 is connected to the communication bus 11; the second communication part 32 is connected to the communication bus 12; the third communication part 33 is connected to the communication bus 13. When detecting a CAN message transmitted to the communication bus 11, the first communication part 31 notifies the control part 30 of receiving interruption. Similarly, when detecting CAN messages transmitted to the communication buses 12 and 13, which are respectively connected to the second and third communication parts 32, 33, the second and third communication parts 32, 33 notifies the control part 30 of receiving interruption.

The connection part 34 is an interface of a dedicated line 7 connected to the power supply control device 4. The control part 30 obtains power supply state information of the ECUs 21 to 24 from the power supply control device 4 via the connection part 34, and transmits the power supply control information to the power supply control device 4 via the connection part 34.

The storage part 35 is a rewritable nonvolatile memory such as a flash memory, and stores the program 51 to be read out by the control part 30. Other nonvolatile memory such as an EEPROM (registered trademark) may also be used for the substitution of the storage part 35. The storage part 35 also stores a vehicle state table 52 for specifying a vehicle state from each information and a power supply state table 53 indicative of a power supply state in which a subject of power supply control is to be under each condition.

The temporary storage part 36 is used as a transmit/receive buffer. The control part 30 temporarily stores CAN messages received by the first to third communication parts 31 to 33 and CAN messages transmitted from the first to third communication parts 31 to 33 into the temporary storage part 36.

The out-of-vehicle communication part 37 with functions of a GPS (Global Positioning System) receiver, a vehicle-to-vehicle communicator and a vehicle-to-road communicator receives information from outside the vehicle. The out-of-vehicle communication part 37 can also realize communication with the communication terminal device 100 brought into a vehicle through wireless communication. When detecting the receiving of information from outside, the out-of-vehicle communication part 37 notifies the control part 30 of receiving interruption.

The communication terminal device 100 is a communication device which is a so-called smartphone. The communication terminal device 100 is not mounted to the vehicle, in other words, is located in a different location from the vehicle. The control part 30 is capable of performing traveling control of a vehicle based on, for example, the position information or the like transmitted from the communication terminal device 100 through the out-of-vehicle communication part 37. In addition, the control part 30 also has a function of updating a power supply state table 53 of the storage part 35, which is described later, based on the update information transmitted from the communication terminal device 100.

The input/output part 38 is a connector that connects to the sensor 66 and the switch 67. The control part 30 obtains a measurement value measured by the sensor 66 via the input/output part 38. The control part 30 obtains the state of the switch 67 via the input/output part 38.

The sensor 66 is a sensor that measures, for example, a wheel speed. The control part 30 obtains a wheel speed through the sensor 66 from the input/output part 38 to interpret a vehicle state such as whether the vehicle is running or not. The sensor 66 may be an oil temperature sensor or a battery remaining amount sensor. In this case, the control part 30 can detect an abnormal vehicle state based on the information obtained from the sensor 66.

The switch 67 is, for example, an ignition switch. The control part 30 obtains which of an off (lock) state, an accessory state, an on state, a start state or the like the ignition switch 67 is in via the input/output part 38, and grasps a vehicle state according to the state of the ignition switch. Regardless of the ignition switch being in an off state, if the control part 30 obtains information showing that the vehicle is in motion from the sensor 66 serving as a sensor measuring a wheel speed, it is also capable of detecting that the vehicle is in an abnormal state.

It is to be noted that the control part 30, the CAN controller parts in the first to third communication parts 31 to 33, the storage part 35 and the temporary storage part 36 may be configured as a microcomputer.

The power supply control device 4 includes a microcomputer 40 and switches 41 to 45 connected to the microcomputer 40. The microcomputer 40 can communicate with the GW device 3 via the dedicated line 7. The switches 41 to 45 are respectively connected to the ECU 23, the ECU 24, and the loads 63 to 65 that are the subjects for power supply control by using semiconductor fuses. If a control signal indicative of power on/off is inputted from the microcomputer 40, the switches 41 to 45 controls on/off of the connected subjects for power supply control based on the control signal. The control signal is not only restricted to a signal controlling power on/off, but it may be a signal adjusting a current amount or voltage value. This can also achieve power saving or to prevent battery exhaustion by cutting power supply of devices which are not needed. The microcomputer 40 outputs a control signal to the switches 41 to 45 based on the signal information related to power supply control received from the GW device 3. The switches 41 to 45 may be relay switches, however, they may be configured by using semiconductor fuses to aim for miniaturization and light-weighting.

An overview of relay processing carried out by the GW device 3 in the in-vehicle communication system configured as above is described hereinafter. If a CAN message is received by any of the first to third communication parts 31 to 33, the control part 30 of the GW device 3 stores the CAN message into a receive buffer. The control part 30 extracts the necessary signal information from the CAN message stored in the receive buffer and then temporarily stores the signal information. The control part 30 creates a CAN message to be transmitted at the transmit buffer based on the extracted signal information periodically or according to a predetermined timing, such as at the occurrence of an event or the like. The control part 30 transmits the created CAN message from the first to third communication parts 31 to 33 when necessary. Thereby, the GW device 3 achieves relays of various processing by the method in which a CAN message including information required by a relay destination is created and transmitted, but not the method in which the received CAN message is transmitted/received without modifications thereto.

Since the GW device 3 is connected to all of the communication buses 11 to 13, as well as the sensor 66 and the switch 67, the GW device 3 collects necessary information for power supply control required by the power supply control device 4 during a relay, comprehensively determines a vehicle state, creates information related to power supply control corresponding to the vehicle state and then transmits the information to the power supply control device 4. In this case, while performing processing for specifying a vehicle state comprehensively, the control part 30 of the GW device 3 refers to the vehicle state table 52 stored in the storage part 35 to make the specification. The control part 30 also determines power supply control information corresponding to the vehicle state based on the power supply state table 53 stored in the storage part 35.

FIG. 2 is an explanatory view that shows an example of the content of the vehicle state table 52 included in the GW device 3 according to Embodiment 1. The vehicle state table 52 shows the correspondence between inputs of, for example, the signal information S1 to S5 included in the CAN message received from each of the ECUs 21 to 24 via the communication buses 11 to 13, the information I1, I2, I3 . . . obtained from the sensor 66, the switch 67 or outside the vehicle and outputs of identification information of the vehicle state, which can be specified by the inputs. As shown in FIG. 2, when the signal information S1 is "1" and S2 is "1," the vehicle state corresponds to "scene 1." When all the signal information S1 to S3 are "1" and the signal information S4 is "0," the vehicle state corresponds to "scene 2." If the signal information S1 and S2 are "1" and the information I1 obtained from outside the vehicle corresponds to the value "x" and the information I2 also obtained from outside the vehicle corresponds to the value "y," the vehicle state corresponds to "scene 3." When the signal information S1 and S2 are "0" and the information I3 obtained from outside the vehicle corresponds to the value "z," the vehicle state corresponds to "scene N." According to the vehicle state table 52, the control part 30 inputs the obtained signal information S1 to S5, information such as a measurement value obtained via the input/output part 38, and information obtained via the out-of-vehicle communication part 37, and thus can specify a vehicle state from the vehicle state table 52. In addition, by including the conditions for discriminating an abnormal state in vehicle states, it is possible to detect whether or not a vehicle is in an abnormal state by referring to the vehicle state table 52. The vehicle state table 52 is not essential in the present invention, and the control part 30 may be configured to perform processing for specifying a vehicle state based on each piece of information according to the program 51.

FIG. 3 is an explanatory view that shows an example of the content of the power supply state table 53 included in the GW device 3 according to Embodiment 1. The power supply state table 53 shows the correspondence between the information for specifying a vehicle state and the control information for providing an instruction to turn on/off of the object for power control corresponding to each state. The information for identifying a vehicle state corresponds to the output of the vehicle state table 52 shown in FIG. 2. In the example shown in FIG. 3, when the vehicle state is "scene 1," the control information corresponds to "01010000(b);" when the vehicle state is "scene 2," the control information corresponds to "01011100(b);" and when the vehicle state is "scene 3," the control information corresponds to "00000001(b)." Additionally, when the vehicle state is "scene N," in other words, an abnormal state, the control information corresponds to "00001111(b)." This control information is for turning off power of the loads 63 to 65 related to an abnormal state which corresponds to "scene N." Therefore, it is possible to minimize influences on the whole in-vehicle communication system by turning off power of the loads 63 to 65 related to an abnormal state.

It is possible to perform power supply control according to the attribute of each vehicle by changing the correspondence relation in the vehicle state table 52 and the power supply state table 53 as shown in FIGS. 2 and 3 for every vehicle, every vehicle model or the like. For example, it is possible to perform a proper power supply control according to a vehicle by, for example, changing the condition capable of specifying the vehicle state "scene 1" depending on a vehicle model, or configuring control information in which the devices with the power turned off differ according to a model and a destination even with the control information corresponding to the same vehicle state "scene 1." Moreover, the vehicle state table 52 and the power supply state vehicle 53 may be stored in the storage part 35 in advance, or may be received by the control part 30 from a server 101 or a cloud server 102 (refer to FIG. 8) via the out-of-vehicle communication part 37 and updated. In particular, with the configuration capable of updating a part of the power supply state table 53 from the outside, it is possible to perform power supply control according to individual usage states for each vehicle such as turning power off since the operation of a part of loads is not needed.

Figure 4:
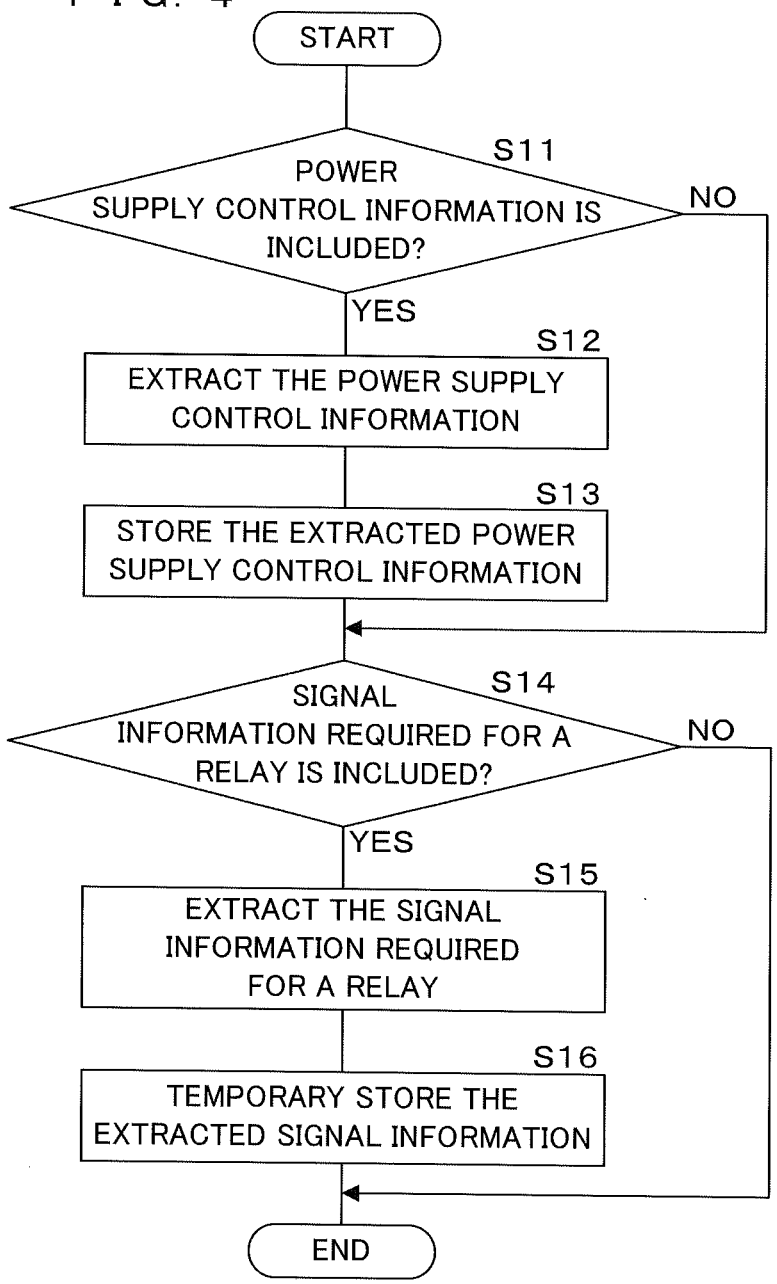
FIG. 4 is a flowchart showing an example of a processing procedure when receiving information in relay processing carried out by the GW device according to Embodiment 1.

Relay processing carried out by the GW device 3 in the in-vehicle communication system configured as described above is described in detail with reference to flowcharts. FIG. 4 is a flowchart showing an example of a processing procedure when receiving information in relay processing carried out by the GW device 3 according to Embodiment 1. In a case where notification of receiving interrupt is transmitted to the control part 30 from the first to third communication parts 31 to 33 or the out-of-vehicle communication part 37, the control part 30 executes the following processing.

The control part 30 determines whether or not signal information (power supply control information) required for power supply control by the power supply control device 4 is included in the received information (step S11). If information is received through the first to third communication parts 31 to 33, since the information is transmitted by a CAN message, the control part 30 herein specifies a CAD ID and a communication bus, specifies the content of the information, and then determines whether the power supply control information is included or not.

If it is determined that the power supply control information is included (S11: YES), the control part 30 extracts the power supply control information (step S12), and then temporarily stores the extracted power supply control information into the temporary storage part 36 (step S13).

The control part 30 then determines whether or not the information required for a relay is included in the received information (step S14). Also in this case, if the information is received through the first to third communication parts 31 to 33, since the information is transmitted by a CAN message, the control part 30 specifies a CAN ID and a communication bus, and then determines whether or not the information required for a relay is included.

If it is determined that the information required for a relay is included at step S14 (S14: YES), the control part 30 extracts the necessary signal information from the received information (step S15). The control part 30 temporarily stores the extracted signal information into the temporary storage part 36 (step S16) and then terminates receiving processing.

If the control part 30 determines that power supply control information is not included at step S11 (S11: NO), processing proceeds to step S14.

If it is determined that the information for a relay is not included in step S14 (S14: NO), the control part 30 terminates receiving processing as it is.

Figure 5:
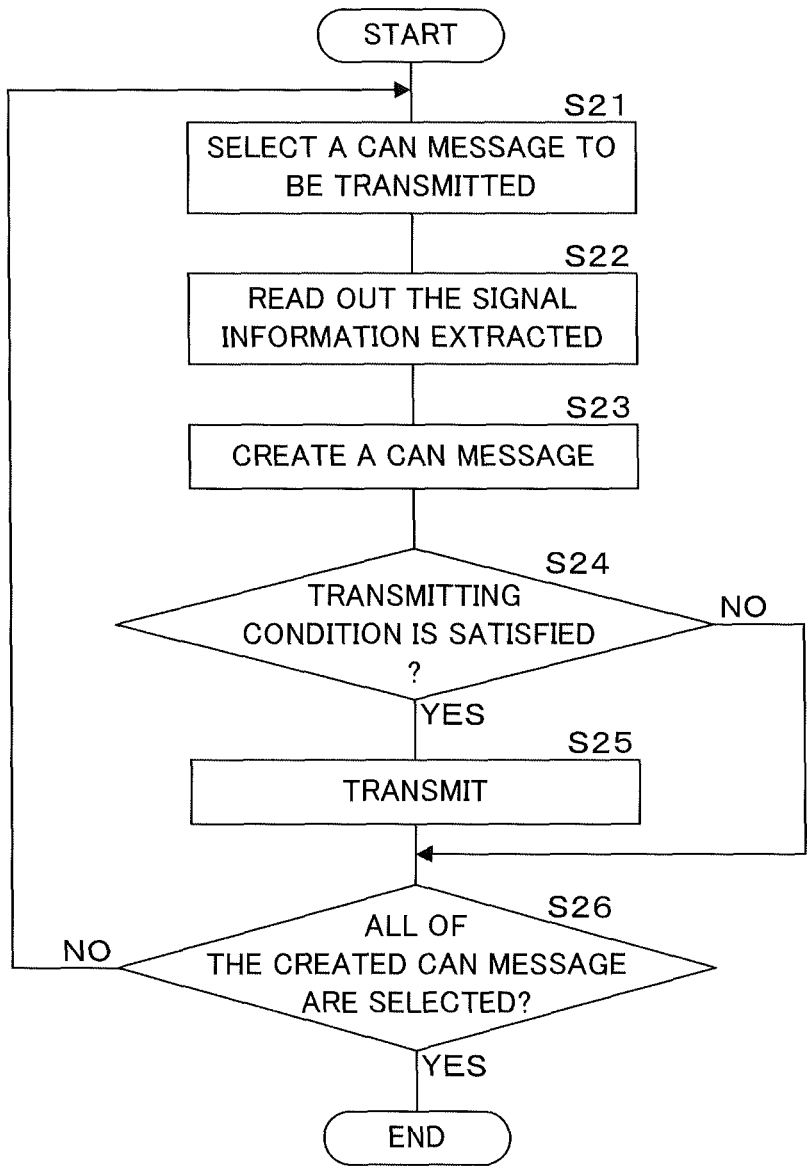
FIG. 5 is a flowchart showing an example of a processing procedure when transmitting a CAN message in relay processing carried out by the GW device according to Embodiment 1.

FIG. 5 is a flowchart showing an example of a processing procedure when transmitting a CAN message in relay processing carried out by the GW device 3 according to Embodiment 1. The GW device 3 may execute the following processing whenever a CAN message is received or may execute the processing described below periodically. A transmission timing is stored along with the information specifying a CAN message to be transmitted. When the transmission timing of each CAN message arrives, the following processing is executed. In a case of performing periodically, the GW device 3 counts a certain period of, for example, ten milliseconds at a timer part (not illustrated), and then notifies the control part 30 of timer interruption whenever ten milliseconds have elapsed. The control part 30 executes the following transmitting (relay) processing in a case where the timer interruption is notified.

The control part 30 selects a CAN message to be transmitted (step S21). The control part 30 reads out the signal information extracted as it requires a relay (step S22), and then creates a CAN message by selecting the signal information to be included in the selected CAN message to be transmitted, from the extracted signal information (step S23).

The control part 30 determines whether the transmitting condition for the created CAN message is satisfied or not (step S24). For example, as for the case where a processing procedure illustrated in FIG. 5 is executed periodically (at every ten milliseconds), if the transmitting condition is set to transmit at every thirty milliseconds which is three times as much as the period, the control part 30 determines that the transmitting condition is not satisfied after ten milliseconds or twenty milliseconds have elapsed.

If it is determined that the transmitting condition is satisfied (S24: YES), the control part 30 provides and transmits the created CAN message to any of the first to third communication parts 31 to 33 which is to be a relay destination (step S25).

The control part 30 determines whether all of the CAN messages to be transmitted are selected or not (step S26). If it is determined at step S26 that all of the CAN messages are selected (S26: YES), then the control part 30 terminates relay processing.

If the control part 30 determines that the transmitting condition is not satisfied at step S24 (S24: NO), then processing proceeds to step S26.

If the control part 30 determines there is an unselected CAN messages at step S26 (step S26: NO), processing is returned to step S21, and then processing is executed for the next CAN message to be transmitted.

Figure 6:
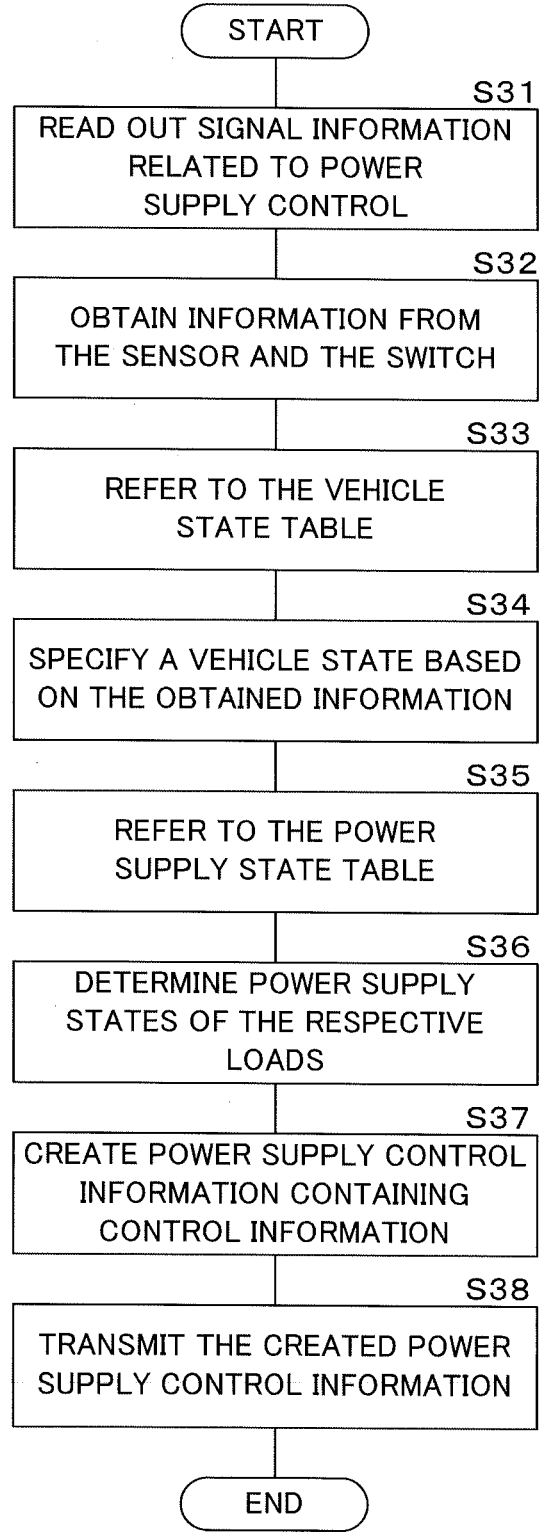
FIG. 6 is a flowchart showing an example of a processing procedure when the GW device according to Embodiment 1 transmits power supply control information to a power supply control device.

FIG. 6 is a flowchart showing an example of a processing procedure when the GW device 3 according to Embodiment 1 transmits power supply control information to the power supply control device 4. When the transmission timing related to power supply control information obtained from the power supply control device 4 arrives, the following processing is executed. A transmission timing required by the power supply control device 4 may be periodically or at the occurrence of an event such as when signal information is changed to predetermined information.

The control part 30 reads out the temporarily stored signal information related to power supply control, which is received from the first to third communication parts 31 to 33 or the out-of-vehicle communication part 37, from the temporary storage part 36 (step S31), and obtains information from the sensor 66 and the switch 67 through the input/output part 38 (step S32).

The control part 30 refers to the vehicle state table 52 from the storage part 35 (step S33) and specifies a vehicle state according to the vehicle state table 52 using the signal information as the input and various types of information obtained at steps S31 and S32 (step S34).

The control part 30 then refers to the power supply state table 53 from the storage part 35 (step S35), and determines power supply states of the respective loads 61 to 65 by obtaining control information corresponding to the vehicle state specified at step S34 (step S36).

The control part 30 creates power supply control information containing control information for providing an instruction of the power supply state determined at step S36 (step S37), transmits the created power supply control information from the connection part 34 to the power supply control device 4 (step S38), and then terminates processing.

The control part 30 of the GW device 3 specifies a vehicle state comprehensively with not only the obtained signal information S1 to S5 but also the information obtained from the directly connected sensor 66 and switch 67 as well as the information obtained through out-of-vehicle communication, therefore, fine power supply control can be achieved.

Figure 7:
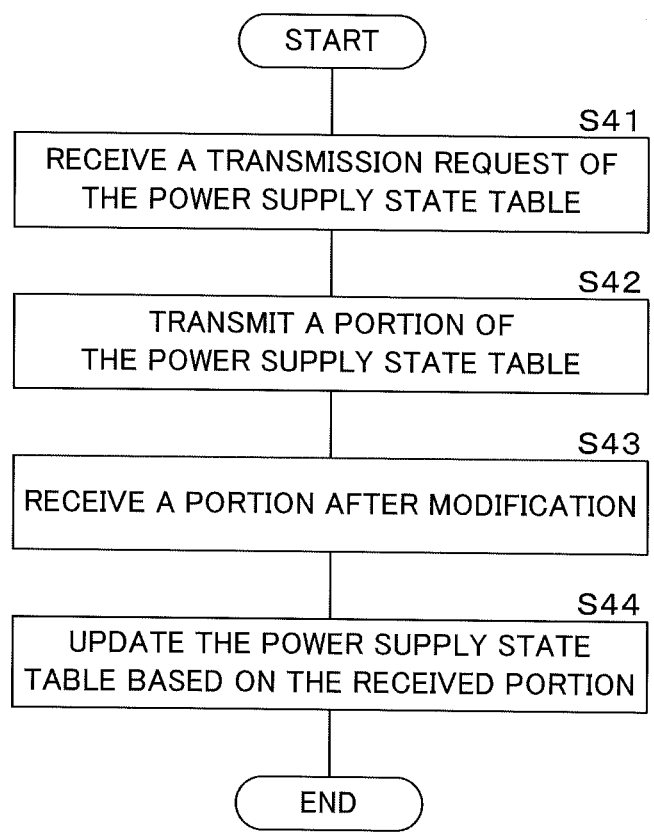
FIG. 7 is a flowchart showing an example of a processing procedure for updating the power supply state table in Embodiment 1.

Next, processing for updating the power supply state table 53 is described. FIG. 7 is a flowchart showing an example of a processing procedure for updating the power supply state table 53 in Embodiment 1. The following processing is executed while a particular application for realizing the editing or viewing of the power supply state table 53 in the communication terminal device 100 is activating.

The control part 30 of the GW device 3 receives a transmission request of the power supply state table 53 through the out-of-vehicle communication part 37 (step S41). The control part 30 transmits a portion which can be modified within the power supply state table 53 according to the request (step S42). Since there are some portions which cannot be modified for safety reasons, in the power supply state table 53, it is preferable to transmit only a portion which can be modified by a user in response to the request made from the communication terminal device 100 used by the user.

The communication terminal device 100 receives the transmitted portion, displays it on a display and receives modification, and then transmits the modified part to the GW device 3.

Then, the control part 30 of the GW device 3 receives a portion of the power supply state table 53 after modification (step S43), updates the power supply state table 53 stored in the storage part 35 based on the received portion (step S44), and then terminates processing.

As described above, it is possible to modify a portion of the power supply state table 53 via the communication terminal device 100 used by a user. Therefore, it is possible to set power supply states for the respective loads 61 to 65, namely, whether the power supply may be cut off, whether the loads may be transferred to be in a sleep state, or the like according to the preference of the user. Not only the communication terminal device 100 but also an ECU including a monitor and button set in a vehicle may be configured to similarly accept an update.

The power supply control device 4 according to Embodiment 1 is configured to input a control signal for controlling power on/off to the switches 41 to 45. However, the present invention is not restricted to this configuration, but the power supply control device 4 may adjust the ECU 23, ECU 24 and the loads 63 to 65 in a power saving mode or a sleep mode. In this case, the power supply control device 4 specifically adjusts a current amount, a voltage value or the like supplied to each load.

According to Embodiment 1, the GW device 3 is connected to the power supply control device 4 via the dedicated line 7. However, the present invention is not restricted to this configuration, but the power supply control device 4 may be also connected to a communication bus similarly to the ECUs 21 to 24, and may transmit/receive a CAN message pursuant to the CAN protocol, and receive the CAN message including signal information related to power supply control from the GW device 3.

(Embodiment 2)

According to Embodiment 2, the GW device 3 transmits/receives information to/from a server placed in a server center which is managed by a vehicle manufacturer or a vehicle dealer.

Figure 8:
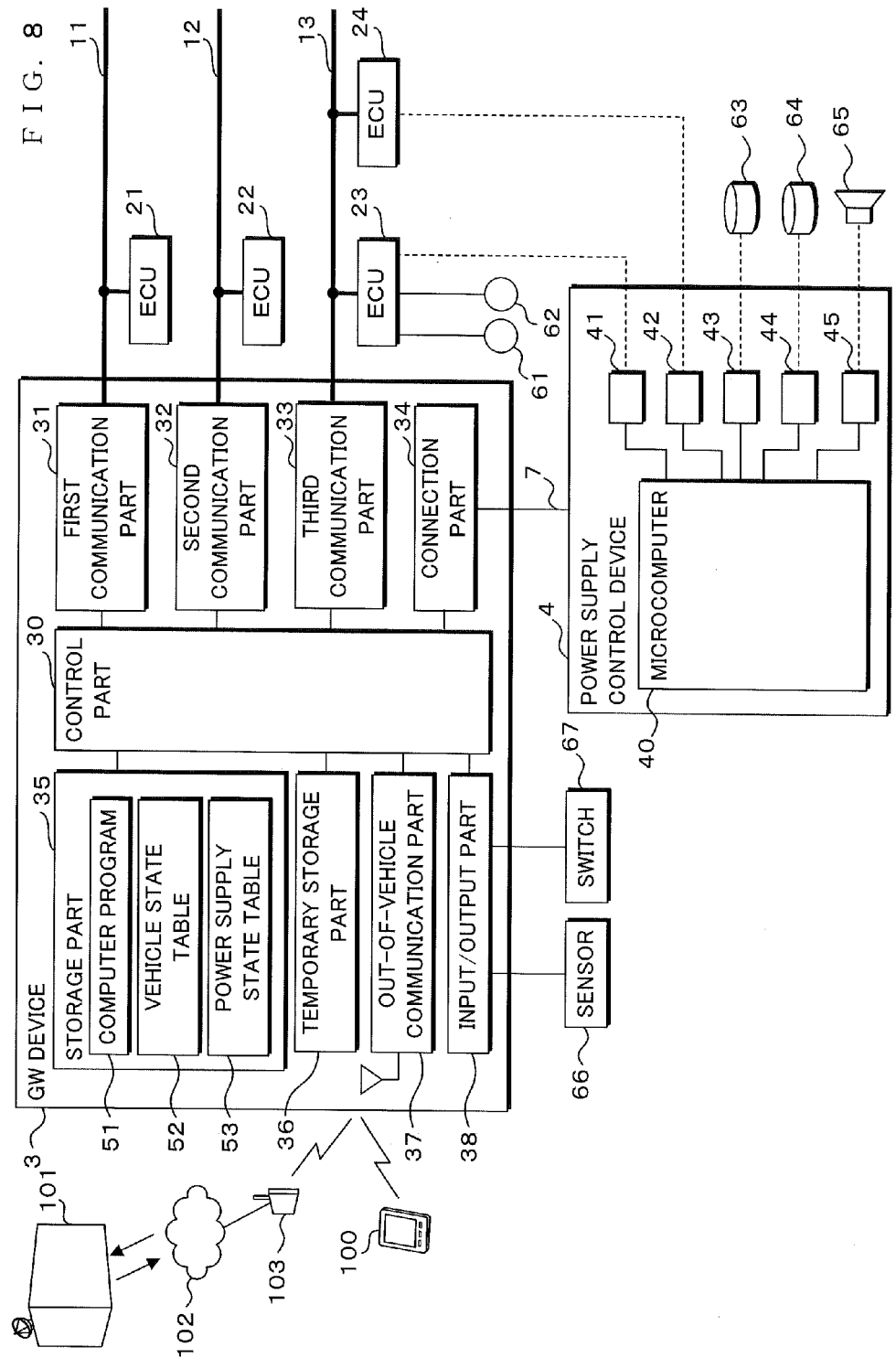
FIG. 8 is a block diagram showing the configuration of an in-vehicle communication system according to Embodiment 2.

FIG. 8 is a block diagram showing the configuration of an in-vehicle communication system according to Embodiment 2. In the configuration of the in-vehicle communication system according to Embodiment 2, the configuration parts common to those in Embodiment 1 are denoted by the same reference numerals and will not be described in detail.

The out-of-vehicle communication part 37 of the GW device 3 according to Embodiment 2 has a function of a wireless LAN communicator to realize communication with a server 101 and a cloud server 102 via an access point 103. The server 101 and the cloud server 102 are placed at a server center as a server managed by a vehicle manufacturer or a vehicle dealer. Similar to Embodiment 1, the out-of-vehicle communication part 37 may have a function of a GPS receiver, a vehicle-to-vehicle communicator, or a vehicle-to-road communicator, and may realize communication with the communication terminal device 100 brought into a vehicle through wireless communication. The control part 30 receives proper information from the server 101, the cloud server 102 or the communication terminal device 100 through the out-of-vehicle communication part 37. For example, the control part 30 is capable of receiving update information of the program 51 stored in the storage part 35 through the out-of-vehicle communication part 37 and receiving update information for the vehicle state table 52 or the power supply state table 53.

For example, an initial power supply state table for each of different vehicle models, destinations or the like is stored in the server 101. The power supply state table 53 stored in the GW device 3 may be the one transmitted from the server 101 to the GW device 3, and received by the GW device 3 from the out-of-vehicle communication part 37 to be stored at the time of delivery or the like.

The GW device 3 is capable of transmitting/receiving the power supply state table 53 with the server 101 or the cloud server 102 through the out-of-vehicle communication part 37. For example, if the same user operates a different vehicle, it is possible that the power supply state table 53 used in an in-vehicle communication system at one vehicle can be applied to another vehicle. In other words, different vehicles may share the power supply state table 53.

The following explains the mechanism of different vehicles sharing the power supply state table 53. For example, the communication terminal device 100 activates a particular application for realizing the viewing or editing of the power supply state table 53. When the power supply state table 53 is updated, the power supply state table 53 unique to the user after an update is transmitted to the server 101 or the cloud server 102. FIG. 9 is a flowchart showing an example of processing procedure in which the power supply state table 53 are shared by different vehicles. The following processing is performed after the processing procedure shown in the flowchart of FIG. 7 according to Embodiment 1 is executed.

The control part 30 of the GW device 3 reads out the power supply state table 53 after an update (step S51), and transmits the power supply state table 53 to the server 101 or the cloud server 102 from the out-of-vehicle communication part 37 along with the stored user identification information (step S52).

The server 101 or the cloud server 102 receives user identification information and the power supply state table 53 (step S53), and stores the user identification information and the power supply state table 53 in association with each other (step S54).

The user causes the communication terminal device 100 to transmit a transmission request of the power supply state table 53 to another vehicle along with user identification information before driving the different vehicle (step S55).

The server 101 or the cloud server 102 receives the transmission request (step S56), transmit the power supply state table 53, specified based on user identification information received with the transmission request, to the GW device of the another vehicle, which is a transmission source of the transmission request, the power supply state table 53 is the stored in association with the user identification information (step S57).

In the other vehicle, the GW device receives the power supply state table 53 (step S58) and causes the storage part to store the power supply state table 53 (step S59).

Therefore, even if the user boards on another vehicle, the power supply state table 53, which is set according to the user's preference, can also be applied to the other vehicle. For example, a user can operate not only a personal vehicle but also a different vehicle at a state according to the user's preference in a case of renting the vehicle.

It is possible to utilize the mechanism of different vehicles sharing the information related to power supply control as described above, and it is also possible to share the information related to power consumption in a vehicle in the server 101 or the cloud server 102 in the case where a user operates a different vehicle. FIG. 10 is a flowchart showing an example of transmitting/receiving processing of the information related to power consumption according to Embodiment 2. The following processing, for example, is executed after the transmitting processing of power supply control information shown in FIG. 6 according to Embodiment 1.

The control part 30 of the GW device 3 calculates power consumption in a vehicle based on power supply control information corresponding to the determined vehicle state (step S61). The control part 30 transmits the information of calculated power consumption with the stored user identification information from the out-of-vehicle communication part 37 to the server 101 or the cloud server 102 (step S62).

The server 101 or the cloud server 102 receives the transmitted information of power consumption and user identification information (step S63), and stores the received information in association with each other (step S64). The server 101 or the cloud server 102 accepts an output request of information including user identification information (step S65), and extracts the information on power consumption stored in association with the user identification information included in the output request (step S66). The server 101 or the cloud server 102 adds up the information of power consumption for each piece of user identification information based on the read information (step S67) and then outputs addition results (step S68), and finally terminates processing. The output of addition results is configured as a request source of the output request accepted at step S65. Also, the output of addition results may be displayed on a display device or printed out by a printing device.

Therefore, even if a user boards on a different vehicle, the information of power saving state during the vehicle's travelling is managed by a server so that the processing such as reflecting the information to the ranking of fuel efficiency of each user or the like can be achieved.

In addition, according to both of Embodiments 1 and 2, one power supply control device 4 exists in an in-vehicle communication system. However, the present invention is not restricted to this configuration, and an in-vehicle communication system provided with a plurality of power supply control devices may be configured such that each power supply control device performs power supply control of an ECU, a load and the like.

It should be understood that the embodiments disclosed above are only illustrative but not restrictive. Since the scope of the invention is defined by the appended claims rather than by the description preceding them, all changes that fall within metes and bounds of the claims, or equivalence of such metes and bounds thereof are therefore intended to be embraced by the claims.

What is claimed is:

1. An in-vehicle communication system comprising:
    a plurality of communication buses mounted in a vehicle;
    a plurality of communication devices connected to any one of the plurality of communication buses;
    a relay device for relaying information among different communication buses; and
    a power supply control device for respectively performing power supply control of one or a plurality of in-vehicle devices being connected;
    wherein:
        one communication device of the plurality of communication devices transmits/receives an information group including one or more pieces of information to one communication bus of the plurality of communication buses, and
        the relay device comprises:
            a plurality of communication parts respectively connected to the plurality of communication buses;
            a communication control part for transmitting/receiving the information group transmitted from each communication device through the plurality of communication parts;
            a storage part in which a power supply state table indicative of power supply states in which said one or a plurality of in-vehicle devices are to be under each vehicle state is stored in a rewritable manner, for each of a plurality of vehicle states predetermined in the vehicle;
            an extracting part for extracting information required for power supply control of said one or a plurality of in-vehicle devices respectively from information groups received via different communication buses among the plurality of communication buses;
            a specifying part for specifying a vehicle state based on the information extracted by the extracting part;
            a determining part for determining a power supply state of one or a plurality of in-vehicle devices, based on a vehicle state specified by the specifying part and the power supply state table stored in the storage part;
            a creating part for creating control information for providing an instruction of a power supply state determined by the determining part; and
            a transmitting part for transmitting control information created by the creating part to the power supply control device.

2. The in-vehicle communication system according to claim 1, wherein
    the communication device, relay device, power supply control device or other devices comprise an accepting part for accepting an update of a portion or all of the power supply state table, and the relay device updates a power supply state table in the storage part based on an update accepted by the accepting part.

3. The in-vehicle communication system according to claim 1, further comprising:
    a wireless communication device, wherein
    the wireless communication device is located at a location different from the vehicle and comprises a wireless communication control part for transmitting/receiving information among the relay devices through wireless communication, wherein
    the wireless communication device transmits a power supply state table, which corresponds to the vehicle, to the relay device, and
    the relay device causes the storage part to store a power supply state table received from the wireless communication device, and
    the determining part determines a power supply state based on the power supply state table stored in the storage part.

4. The in-vehicle communication system according to claim 1, further comprising:
    a wireless communication device, wherein
    the wireless communication device located at a location different from the vehicle
    comprises a wireless communication control part for transmitting/receiving information among the relay devices through wireless communication and a storage part for storing information;
    receives a power supply state table and user identification information transmitted from the relay device;
    stores the received power supply state table and the received user identification information in association with each other into the storage part;
    receives a table transmission request including user identification information; and
    transmits a power supply state table associated with the user identification information to a request source in response to the received table transmission request; and
    the relay device transmits a power supply state table stored in the storage part and user identification information for identifying a vehicle's user to the wireless communication device.

5. The in-vehicle communication system according to claim 1, further comprising:
    a wireless communication device, wherein
    the wireless communication device is located at a location different from the vehicle, and comprises a wireless communication control part for transmitting/receiving information among the relay devices through wireless communication and a storage part for storing information, wherein
    the relay device further comprises a creating part for creating information related to power consumption of a vehicle based on control information for providing an instruction of a power supply state determined by the determining part and transmits user identification information for identifying a user of the vehicle and information related to power consumption created by the creating part to the wireless communication device, and
    the wireless communication device receives the user identification information and the information related to power consumption, and stores the received information related to power consumption in association with the user identification information into the storage part.

6. An in-vehicle communication system for use with a vehicle, the in-vehicle communication system comprising:
a plurality of communication buses mounted in the vehicle;
a plurality of communication devices connected to any one of the plurality of communication buses, wherein one communication device of the plurality of communication devices transmits/receives an information group including one or more pieces of information to one communication bus of the plurality of communication buses;
a power supply control device for respectively performing power supply control of one or a plurality of in-vehicle devices being connected; and
a relay device configured to relay information between different communication buses, the relay device including: (i) an interface connected to each communication bus, (ii) a memory storing a power supply state table identifying power supply states of one or more in-vehicle devices under each vehicle state, for each of a plurality of vehicle states in the vehicle, and (iii) a processor operatively coupled to the memory, the processor being programmed to:
transmit/receive the information group transmitted from each communication device;
extract information required for power supply control of the one or more in-vehicle devices respectively from information groups received via different communication buses among the plurality of communication buses;
specify a vehicle state based on the information extracted by the extracting part;
determine a power supply state of one or more in-vehicle devices based on the specified vehicle state and the power supply state table stored in the memory;
create control information to provide an instruction of the determined power supply state; and
transmit the created control information to the power supply control device.

7. The in-vehicle communication system according to claim 6, wherein
at least one of the communication device, relay device, power supply control device or other in-vehicle devices are programmed to accept an update of a portion or an entirety of the power supply state table, and
the processor of the relay device modifies the power supply state table in the memory based on the accepted update.

8. The in-vehicle communication system according to claim 6, further comprising:
a wireless communication device located at a location different from the vehicle and includes a processor programmed to:
transmit/receive information among the relay devices through wireless communication, and
transmit the power supply state table to the relay device of the vehicle, wherein:
the processor of the relay device stores the power supply state table transmitted from the wireless communication device, and
the processor of the relay device determines the power supply state based on the power supply state table stored in the memory.

9. The in-vehicle communication system according to claim 6, further comprising:
a wireless communication device located at a location different from the vehicle and including: (i) a second memory, and (ii) a second processor operatively coupled to the second memory, the second processor being programmed to:
transmit/receive information among the relay devices through wireless communication and a storage part for storing information;
receive the power supply state table and user identification information transmitted from the relay device;
store the received power supply state table and the received user identification information in association with each other into the second memory;
receive a table transmission request including user identification information; and
transmit a power supply state table associated with the user identification information to a request source in response to the received table transmission request; wherein:
the relay device transmits the power supply state table stored in the memory and user identification information identifying a vehicle's user to the wireless communication device.

10. The in-vehicle communication system according to claim 6, further comprising:
a wireless communication device located at a location different from the vehicle, and including: (i) a second memory that stores information, and (ii) a second processor operatively connected to the second memory, the second processor being programmed to:
transmit/receive information among the relay devices through wireless communication; and
store the received information in the second memory, wherein:
the processor of the relay device is further programmed to:
create information related to power consumption of a vehicle based on the determined control information for providing an instruction of a power supply state; and
transmit user identification information for identifying a user of the vehicle and information related to power consumption created by the creating part to the wireless communication device, wherein
the second processor of the wireless communication device receives the user identification information and the information related to power consumption, and stores the received information related to power consumption in association with the user identification information into the second memory.

* * * * *